United States Patent
Thiessen

[15] 3,635,327
[45] Jan. 18, 1972

[54] RAPID LOADING AND UNLOADING EQUIPMENT

[72] Inventor: Walter H. Thiessen, Long Beach, Calif.
[73] Assignee: Darnell Corporation, Ltd., Downey, Calif.
[22] Filed: Nov. 8, 1968
[21] Appl. No.: 774,423

[52] U.S. Cl. ........................................................... 198/126
[51] Int. Cl. ........................................................ B65g 21/00
[58] Field of Search ..................... 198/173, 117, 126, 118; 214/23

[56] References Cited

UNITED STATES PATENTS

| | | | |
|---|---|---|---|
| 2,631,715 | 3/1953 | Vickers | 198/118 |
| 668,079 | 2/1901 | Baker | 198/173 |
| 2,632,557 | 3/1953 | Lindberg | 198/117 |
| 3,104,768 | 9/1963 | Bassett | 214/23 |

FOREIGN PATENTS OR APPLICATIONS 1,267,166  4/1968  Germany ............................ 198/118

Primary Examiner—Richard E. Aegerter
Attorney—White & Haefliger

[57] ABSTRACT

The disclosure concerns equipment for rapidly loading and unloading loads (such as molds with respect to presses), and utilizing a load actuator movable on a load conveyor carried by a scissors linkage enabling precise and rapid movement of the load between positions on and off the conveyor.

8 Claims, 10 Drawing Figures

INVENTOR.
WALTER H. THIESSEN
By White & Haefliger
ATTORNEYS.

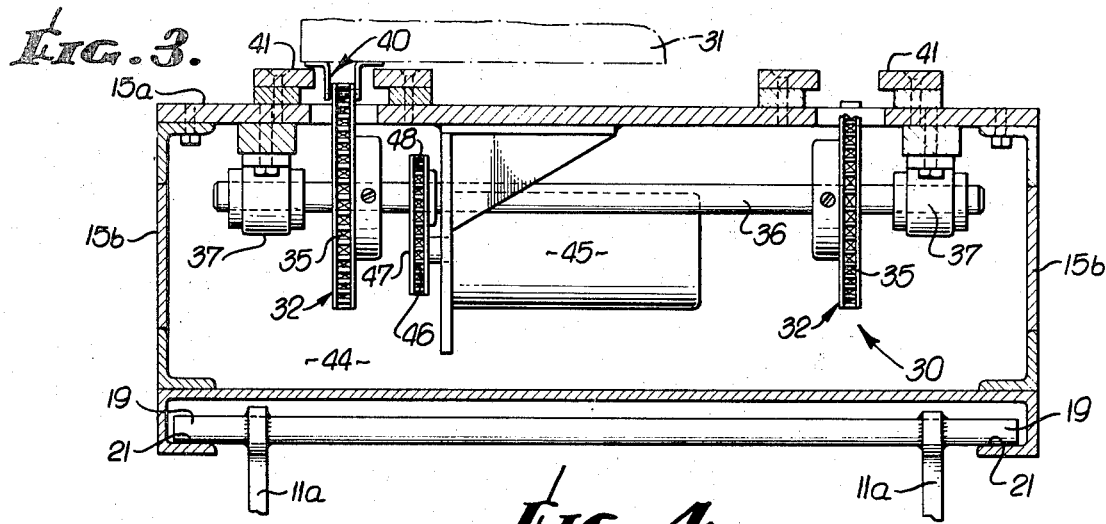
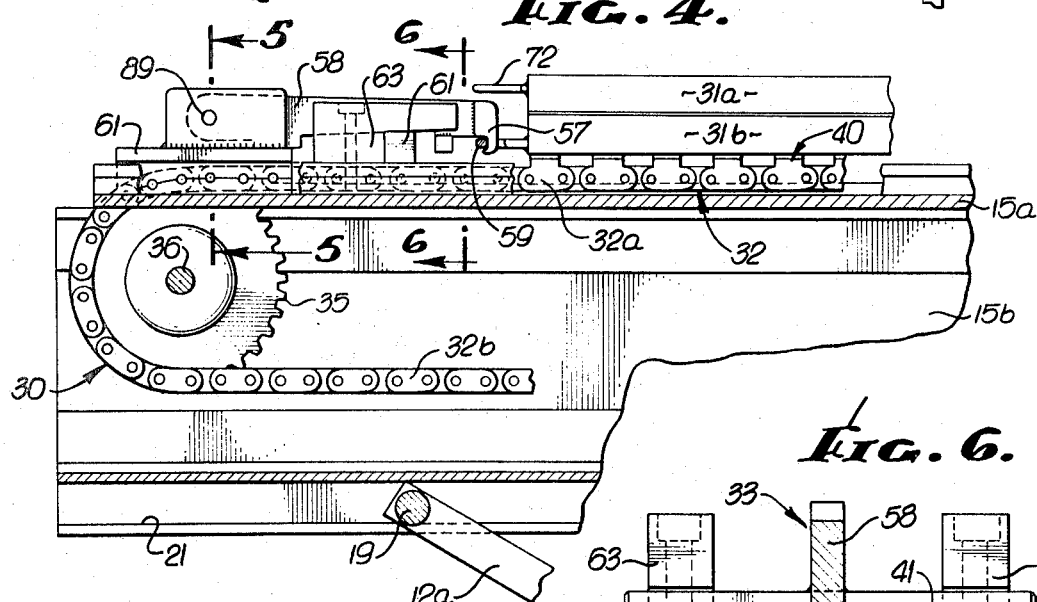
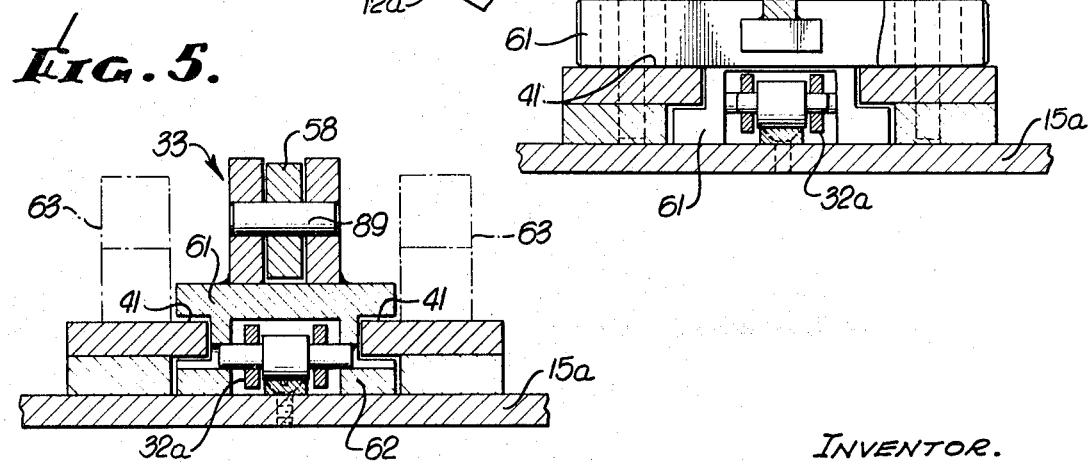

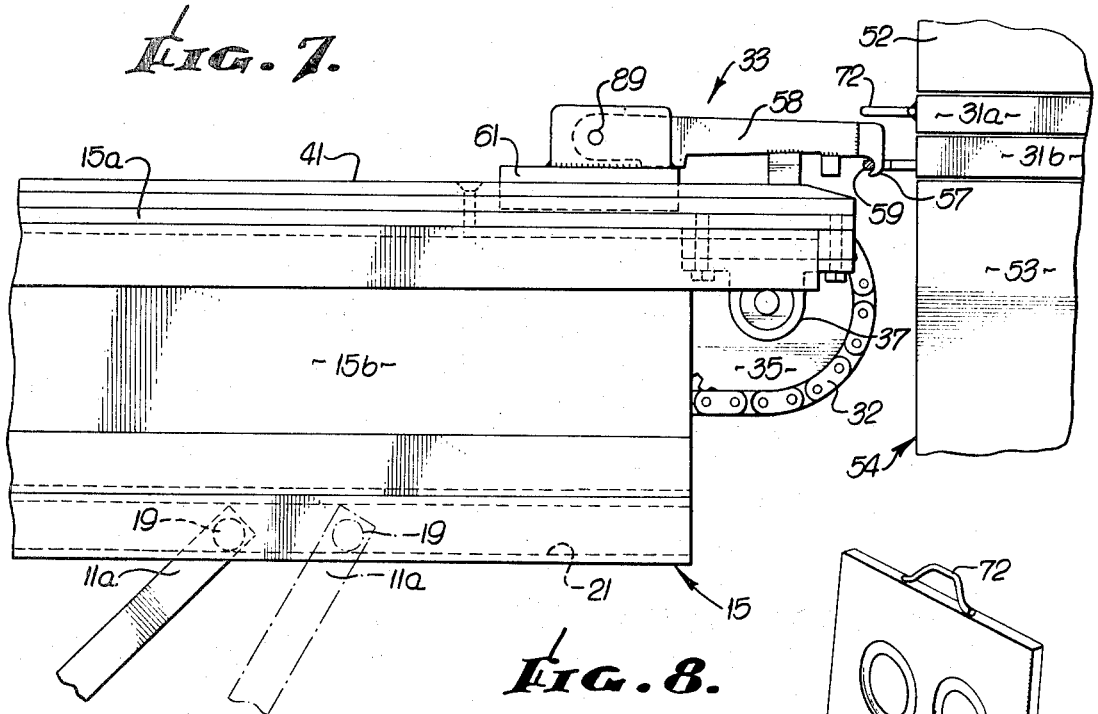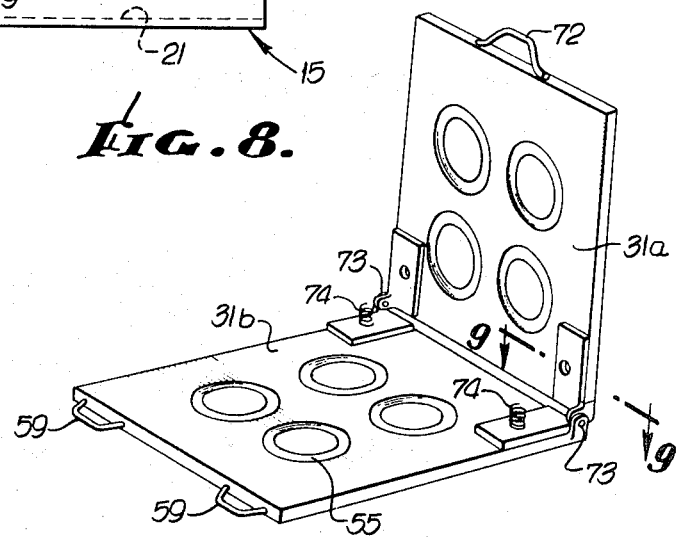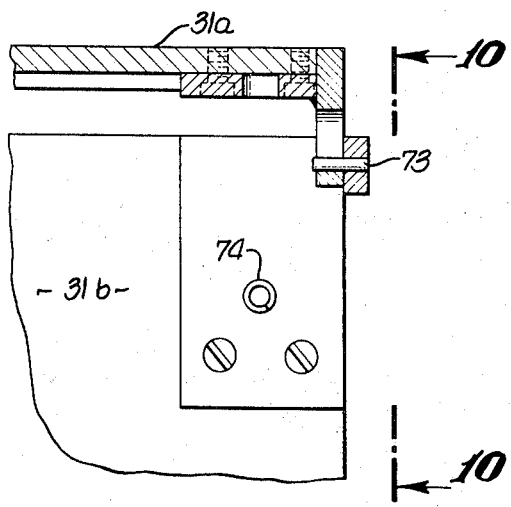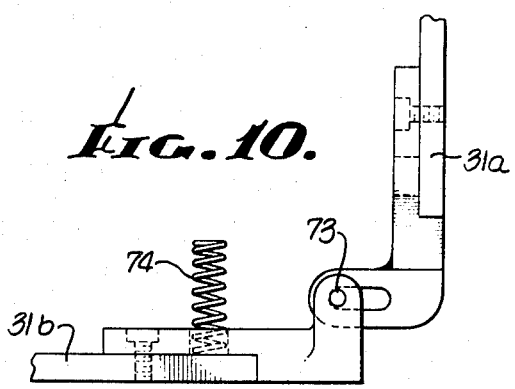

3,635,327

RAPID LOADING AND UNLOADING EQUIPMENT

BACKGROUND OF THE INVENTION

This invention relates generally to equipment for rapidly loading and unloading workloads, and more specifically concerns the rapid loading of molds into presses followed by unloading through use of automatically operated equipment.

In the past, the loading of molds (such as are used for forming rubber or other articles) into medium size presses for curing under heat and/or pressure, and the unloading and opening of the molds, has required considerable lifting an hand manipulative effort on the part of workers. Such effort is time consuming and hence costly, and also can become dangerous due to worker fatigue. Such equipment as has been built in an effort to alleviate such problems has not, to my knowledge, afforded the combination of unusual advantages which accrue from the structure, mode of operation and beneficial results of the present invention, as will be seen.

SUMMARY OF THE INVENTION

It is a major object of the present invention to eliminate the problems referred to above, through the provision of unusually advantageous apparatus enabling rapid, efficient and safe movement of loads such as molds into and out of apparatus such as presses, as well as opening and closing of such molds. Basically, the equipment comprises a scissors linkage including first and second elongated members having pivotal interconnection to accommodate relative pivoting of such members about a generally horizontal axis; a frame carried by the upper extents of such members to be raised and lowered in response to relative pivoting thereof; a conveyor carried by the frame to transport a load and a load actuator on the conveyor to move the load in the direction of conveyor travel; means operatively connected with the conveyor to drive it forwardly and reversely and to advance the actuator sufficiently toward and away from on end of the frame that the load is movable between positions on and off the conveyor; and means operatively connected with the scissors linkage to effect such pivoting to vertically locate the load in relation to such positions. As will be seen, the load is typically received between press platens when it is in the referred to position off the conveyor, and is removable from between the platens back onto the conveyor in response to reverse movement of the conveyor.

It is another object of the invention to combine a conveyor (comprising endless chain means having upper and lower flights) with structure to support a load transported on the conveyor, that structure and the load actuator both being carried on an upper flight of the conveyor to best serve the purposes of load advancement and retraction with respect to the press as well as handling of the load itself. The latter may include opening and closing of the load in the form of a mold box, as will be seen. Thus, the mold may have upper and lower sections, and means may be provided to raise the upper section relative to the lower section to provide access to the mold interior on the conveyor, when retracted from the press and adjusted to desired height suited to the worker.

It is a further object of the invention to provide coupling elements at locations on the mold and actuator elements to be interengaged when the mold is in position on the conveyor, and to become disengaged when the mold is supported off the conveyor (as for example in the press) and as the frame is displaced vertically in response to scissors linkage pivoting. As will be seen, one of the coupling elements may advantageously comprise a hook on the actuator, to engage the other coupling element on the mold and in response to frame vertical movement combined with conveyor movement horizontally.

These and other objects and advantages of the invention, as well as the details of an illustrative embodiment, will become more fully understood from the following description and drawings, in which:

BRIEF DESCRIPTION OF THE DRAWINGS

FIG. 3 is an enlarged vertical section taken on lines 3—3 of FIG. 2;
FIG. 4 is an enlarged and fragmentary vertical section taken on lines 4—4 of FIG. 2;
FIG. 5 is an enlarged vertical section taken on line 5—5 of FIG. 4;
FIG. 6 is an enlarged vertical section taken on line 6—6 of FIG. 4;
FIG. 7 is an enlarged vertical illustration showing loading of a mold into a press;
FIG. 8 shows the mold in opened condition;
FIG. 9 is an enlarged horizontal section taken on line 9—9 of FIG. 8;
and
FIG. 10 is a vertical elevation taken on line 10—10 of FIG. 9.

DESCRIPTION OF THE PREFERRED EMBODIMENTS

Figure 1:
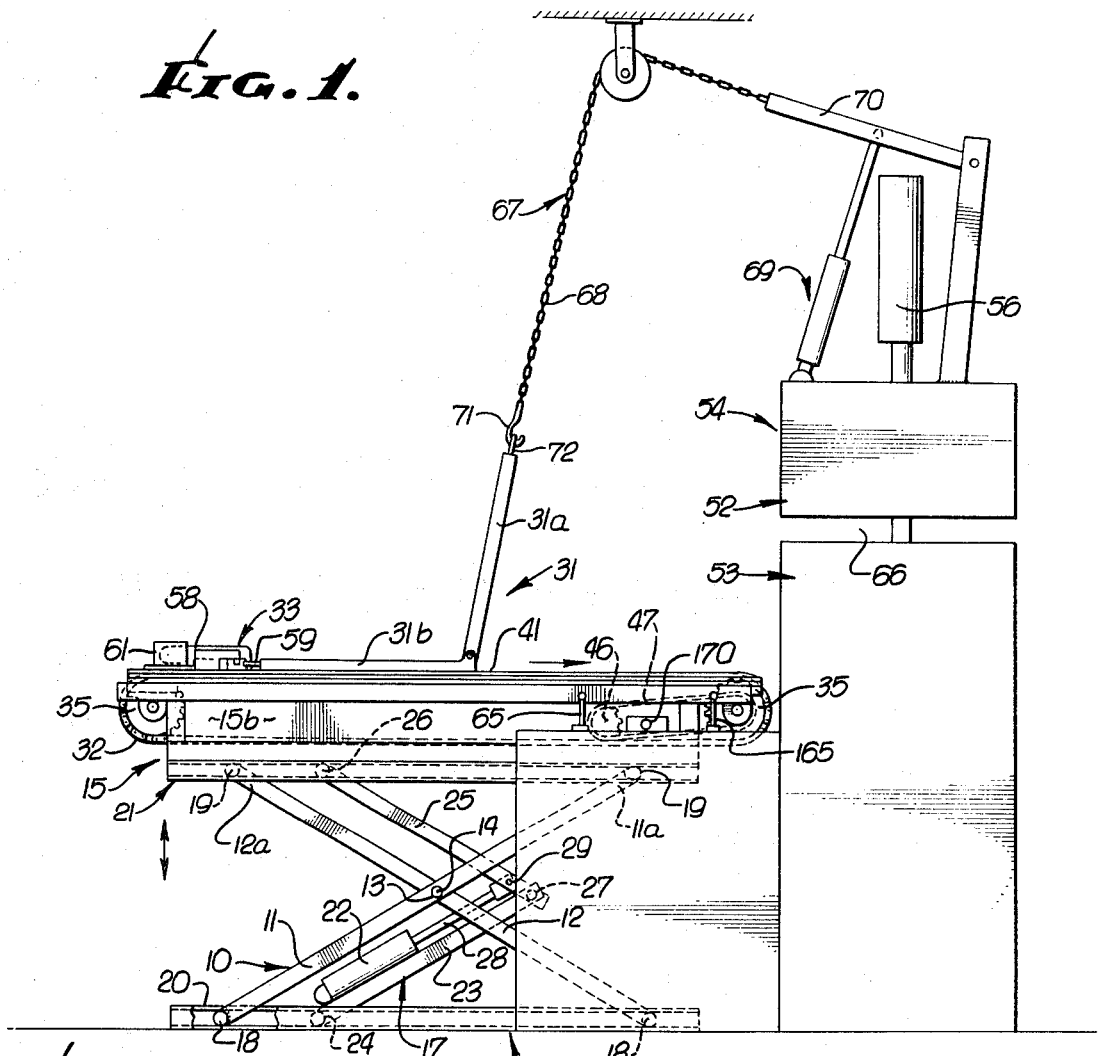
FIG. 1 is a side elevation illustrating the invention in its relation to a mold press.
Figure 2:
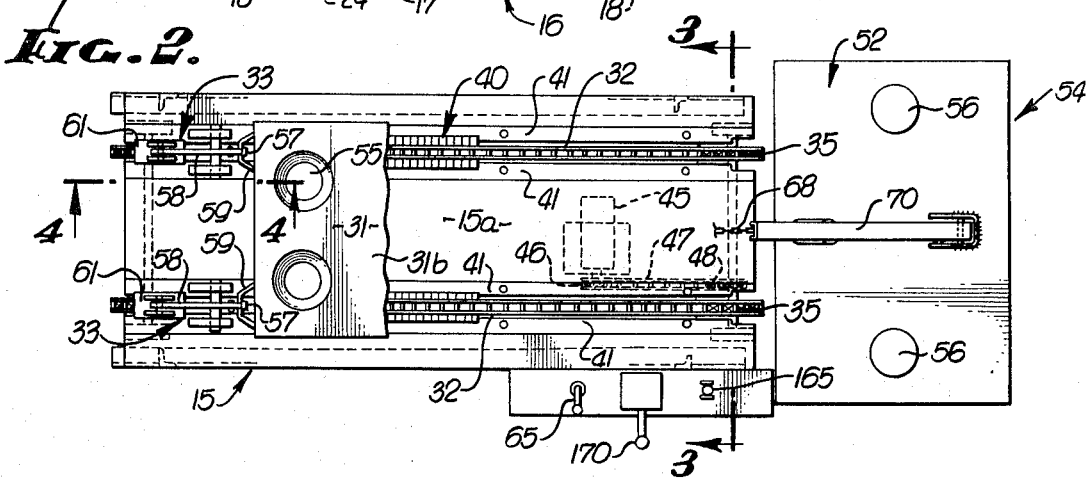
FIG. 2 is a plan view of the FIG. 1 apparatus.

Referring first to FIG. 1, a scissors linkage 10 is shown to include first and second pairs of elongated members 11 and 12 having pivotal interconnection at 13 to accommodate relative pivoting of the members about a horizontal axis 14. A frame 15 is carried by upper extents 11a and 12a of the members 11 and 12 to be raised and lowered in response to their relative pivoting. In this regard, pivot location 13 and axis 14 are enabled to move vertically by virtue of the mounting of the members 11 and 12 to a base 16 and to the frame 15, and of the mode of operation of the drive 17. Note that the end terminals of the members 11 and 12 carry lugs 18 and 19 which are receivable in horizontal tracks or guidings 20 and 21 on the base and frame respectively.

The drive 17 includes a linear actuator having a cylinder 22 mounted on a link 23 pivotally connected to the base at 24. Another link 25 is pivotally connected to the frame 15 at 26, and pivotally connected to link 23 at 27. Finally, the actuator piston rod 28 is pivotally connected to the link 25 at 29, so that as the rod is moved into the cylinder, the links 23 and 25 pivot and elevate the frame 15, and vice versa.

The frame 15 carries a conveyor, generally indicated at 30, and operable to transport a load (as for example a mold 31) as well as a load actuator generally indicated at 33 to move the load in the direction of conveyor travel. One unusually advantageous conveyor comprises endless chain means including spaced parallel chains 32 having upper and lower flights 32a and 32b, as seen in FIGS. 3 and 4. Forward and rearward sprockets 35 carried by the frame via axles 36 and mounts 37 support the chains for horizontal movement of the upper flights 32a. Further, there is structure carried by certain chain links, to support the load transported on the conveyor. FIG. 3 indicates such structure may advantageously take the form of brackets 40 projecting upwardly and laterally to closely overhang the lubricated slide surfaces 41 on the frame. When weight from load 31 is imposed on the brackets, the latter may transmit that weight to those surfaces, whereby functioning of the chain to advance and retract the load is not adversely affected by reception of load weight.

Note that surfaces 41 are formed by structural elements carried by the frame top plate 15a, the frame including sideplates 15b and bottom plate 15c forming an enclosed zone 44 within which the conveyor mechanism is housed for safety purposes. A conveyor drive motor 45 is so enclosed along with the transmission including drive sprocket 46, chain 47, and driven sprocket 48 on the axle 36 of forward sprockets 35. Such drive elements define one unusually advantageous form of drive means operatively connected with the conveyor to drive the upper flight 32a forwardly and reversely to advance the load actuator 33 sufficiently toward and away from the forward end of the frame that the load 31 is movable between positions on and off the conveyor. Note in this regard the location of the load 31 on the conveyor in FIG. 4, and off the conveyor in FIG. 7.

As regards the latter location, two loads 31 are shown received in stacked condition between upper and lower platens 52 and 53 of a press 54 operable to treat the molds. Merely as illustrative, the molds 31 may include upper and lower sections 31a and 31b between which rubber articles are receivable in cavities 55 (seen in FIG. 8) to be cured by application of heat and pressure to the closed mold sections from the press platens. FIG. 1 shows the upper platen 52 as being movable vertically relative to the lower platen by actuator 56.

The actuator 33 and load 31 may advantageously include coupling elements at locations to be interengaged when the mold is in position on the conveyor, and to become disengaged when the mold is supported (as for example in the press) off the conveyor, and as the frame 15 is displaced vertically in response to scissors linkage pivoting. In that form of the invention illustrated, one coupling element comprises hooks 57 on forwardly directed actuator arms 58; and the other coupling element comprises structure such as bails or looping elements 59 on the mold lower section, as better seen in FIG. 8. This facilitates lifting of the upper section 31a without disruption of the coupling from the actuator to the mold. Also, the use of two actuators, laterally spaced apart as shown, prevents misalignment of the mold as it is inserted longitudinally into and removed from the press, while off the conveyor.

Arms 58 have their rearward extents pivotally mounted at 89 to allow their upward counterclockwise pivoting in response to camming engagement of the rounded noses of the hooks 57 with the coupling loops 59 on the molds when the latter are in the press. This may occur as the conveyors advance the hooks forwardly into contact with those loops, in order to retrieve the molds from the press after a molding operation. As the hooks cam upwardly, during their forward advancement, they drop into the recesses formed by the loops, due to the clockwise acting weight of the arms 58. The mold or molds may then be pulled from the press after the upper platen is lifted, to be positioned on the conveyor for servicing (opening, retrieval of the molded articles, placement of other articles into the molds, and closing of the mold sections).

The invention provides for automatic stopping of conveyor advancement in FIG. 7 position, and for automatic stopping of conveyor retraction in FIG. 4 position, at which times the drive may be decoupled from the conveyor, as for example through use of a fluid drive motor. Such stooping in forward position is effected by inability for the carriers 61 to be pulled around the forward sprockets by the chain sections to which such carriers are connected. In other words, the carriers press downwardly against the slide surfaces and stop advancement of the conveyor upper flights in FIG. 7 position. Note in FIGS. 5 and 6 the connection of the carriers to the conveyor upper flights 32a via the bracket elements 62, and the lateral extension of the carriers to overhang the surface 41. Such stopping in retracted position is effected by rearward engagement of the carriers 61 with the stop shoulders 63 on the frame.

During such advancement and retraction of the mold, as described, (through use of a control 165 to control motor 45) the frame or table 15 may be raised or/and lowered by the operator (using a control 65 to operate the actuator 17 via appropriate fluid pressure valving). This enables adjustment of the mold to desired height and horizontal position corresponding to the best location for operator servicing; see in this regard the location of the open mold at a lower elevation than the opening 66 in the press that receives the mold. Such servicing of the mold may be facilitated by an elevator mechanism 67 including a chain 68 adapted to be raised and lowered by an actuator 69 and link 70, there being a hook 71 on the chain to couple to a loop element 72 on the mold upper section for lifting same. Control 170 operates actuator 69.

Reference to FIGS. 8–10 will show the mold sections 31a and 31b to have hinged connection at 73. Compression springs 74 aid in opening of the heavy metal upper section relative to the lower section, the springs being carried by the latter and pressing upwardly against the underside of the upper section. Closure of the molds is, of course, effected in the press.

I claim:

1. In apparatus of the character described, the combination comprising
   a scissors linkage including first and second elongated members having pivotal interconnection to accommodate relative pivoting of said members about a generally horizontal axis,
   a frame carried by the upper extents of said members to be raised and lowered in response to said relative pivoting thereof, said members having generally horizontally relatively movable connection with said frame,
   a base to which the lower extents of said members have generally horizontally relatively movable connection below said pivotal interconnection whereby the member upper extents move relatively together as do the member lower extents in response to member pivoting to raise the frame,
   a conveyor carried by the frame to transport a load in the direction of conveyor travel the conveyor remaining generally horizontal during said pivoting,
   means operatively connected with the conveyor to drive the conveyor forwardly and generally horizontally, and
   means for effecting said pivoting to vertically locate the conveyor and load.

2. The combination of claim 1 wherein said conveyor comprises endless chain means having upper and lower flights, there being structure to support a load transported on the conveyor, said structure being carried on an upper flight of the chain means.

3. The combination of claim 2 wherein said chain means comprises a pair of chains whose upper flights are parallel and directed generally horizontally, and there being slide surfaces on the frame to support said upper flights and the load via said structure.

4. The combination of claim 3 including a load actuator on the conveyor to move the load in the direction of conveyor travel.

5. The combination of claim 4 wherein the load actuator includes an arm mounted to pivot about a generally horizontal axis transverse to the direction of conveyor travel, the arm having a coupling thereon to couple with the load.

6. The combination of claim 1 wherein said members are of substantially equal length and have slidable interconnection with said frame and base.

7. The combination of claim 1 wherein the frame defines a track with which said members have generally horizontal relatively slidable connection at forward and rearward locations above the level of said axis, said locations being substantially equidistant from said axis.

8. The combination of claim 7 wherein said last named means includes pivotally interconnected arms one of which has pivotal connection with the base and the other side of which has pivotal connection with the frame, and an actuator coupled to said arms to effect relative pivoting thereof, said arms extending in generally parallel relation to the members, respectively.

* * * * *